US012597373B2

(12) United States Patent
Park et al.

(10) Patent No.: US 12,597,373 B2
(45) Date of Patent: Apr. 7, 2026

(54) BRIGHTNESS ROLL-OFF COMPENSATION FOR VIRTUAL REALITY DISPLAYS

(71) Applicant: Meta Platforms Technologies, LLC, Menlo Park, CA (US)

(72) Inventors: Yongmin Park, Sammamish, WA (US); Chul Kwon Kang, Sammamish, WA (US); Samara Kate Sytsma, Kirkland, WA (US); Agnes Lee, Da'an (TW); Linghui Rao, Redmond, WA (US); Alexander Klement, Kenmore, WA (US); Hsin-Ying Chiu, San Jose, CA (US); William La, Maple (CA); Xiangzhi Yu, Sunnyvale, CA (US); Thomas Patrick McCarthy, San Francisco, CA (US); Maggie Barbagallo, San Bruno, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/895,087

(22) Filed: Sep. 24, 2024

(65) Prior Publication Data

US 2025/0118233 A1 Apr. 10, 2025

Related U.S. Application Data

(60) Provisional application No. 63/588,541, filed on Oct. 6, 2023.

(51) Int. Cl.
*G09G 3/00* (2006.01)
*G09G 3/32* (2016.01)
(Continued)

(52) U.S. Cl.
CPC ............... *G09G 3/001* (2013.01); *G09G 3/32* (2013.01); *G09G 3/3225* (2013.01); *G09G 3/342* (2013.01);
(Continued)

(58) Field of Classification Search
CPC ........ G09G 3/001; G09G 3/32; G09G 3/3225; G09G 3/342; G09G 3/3648; G09G 2320/0233; G09G 2354/00
See application file for complete search history.

(56) References Cited

U.S. PATENT DOCUMENTS 9,905,168 B1 2/2018 Richards et al.
12,094,432 B1 * 9/2024 Furihata ............... G09G 3/3607
(Continued)

OTHER PUBLICATIONS

International Search Report and Written Opinion for International Application No. PCT/US2024/050121, mailed Jan. 15, 2025, 12 pages.

*Primary Examiner* — Kwang-Su Yang
(74) *Attorney, Agent, or Firm* — Greenberg Traurig, LLP

(57) ABSTRACT

A near-eye display includes a display configured to display images, a memory device storing a compensation profile for compensating perceived brightness nonuniformity (e.g., brightness roll-off) of the display, and a display controller for controlling operations of the display. The compensation profile includes compensation values for modifying brightness in regions of the display to compensate the perceived brightness nonuniformity. The display controller is configured to control brightness of the display based on the compensation profile.

20 Claims, 13 Drawing Sheets

(51) Int. Cl.

| | |
|---|---|
| ***G09G 3/3225*** | (2016.01) |
| ***G09G 3/34*** | (2006.01) |
| ***G09G 3/36*** | (2006.01) |

(52) U.S. Cl.
CPC ... *G09G 3/3648* (2013.01); *G09G 2320/0233* (2013.01); *G09G 2354/00* (2013.01)

(56) References Cited

U.S. PATENT DOCUMENTS

| | | | | |
|---|---|---|---|---|
| 2010/0328339 | A1* | 12/2010 | Cho | G09G 3/3426 345/589 |
| 2018/0322834 | A1* | 11/2018 | Zhang | G09G 3/3607 |
| 2020/0218348 | A1* | 7/2020 | Eash | G02B 5/32 |
| 2022/0319453 | A1* | 10/2022 | Llull | G06F 3/012 |
| 2023/0194869 | A1 | 6/2023 | Lee | |

* cited by examiner

800

1002

1000

BRIGHTNESS ROLL-OFF COMPENSATION FOR VIRTUAL REALITY DISPLAYS

CROSS-REFERENCE TO RELATED APPLICATION

This application claims the benefit of U.S. Provisional Application No. 63/588,541, filed Oct. 6, 2023, entitled "BRIGHTNESS ROLL-OFF COMPENSATION FOR VR DISPLAYS," which is hereby incorporated by reference in its entirety for all purposes.

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10 to 20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)), and the surrounding environment by, for example, seeing through transparent display glasses or lenses (often referred to as optical see-through) or viewing displayed images of the surrounding environment captured by a camera (often referred to as video see-through).

A near-eye display may include an optical system configured to form an image of a computer-generated image on an image plane. The optical system of the near-eye display may relay the image generated by an image source (e.g., a display panel) to create a virtual image that appears to be away from the image source and further than just a few centimeters away from the user's eyes. For example, the optical system may collimate the light from the image source or otherwise convert spatial information of the displayed virtual objects into angular information to create a virtual image that may appear to be far away. The optical system may also magnify the image source to make the image appear larger than the actual size of the image source. It is generally desirable that the near-eye display has a small size, a low weight, a large field of view, a large eye box, a high efficiency, and a low cost.

SUMMARY

This disclosure relates generally to near-eye displays or head-mounted displays. More specifically, and without limitation, techniques disclosed herein relate to compensating the brightness nonuniformity and/or brightness roll-off (BRO) of a near-eye display. Various inventive embodiments are described herein, including devices, systems, methods, structures, materials, processes, methods, and the like.

According to certain embodiments, a near-eye display may include a display configured to display images, a memory device storing a compensation profile for compensating perceived brightness nonuniformity (e.g., brightness roll-off) of the display, and a display controller for controlling operations of the display. The compensation profile may include compensation values for modifying brightness in regions of the display to compensate the perceived brightness nonuniformity. The display controller may be configured to control brightness of the display based on the compensation profile.

According to certain embodiments, a processor-implemented method may include obtaining a compensation profile for compensating perceived brightness nonuniformity of a display of a near-eye display, and controlling brightness of the display based on the compensation profile. The compensation profile may include compensation values for modifying brightness in regions of the display to compensate the perceived brightness nonuniformity. The compensation profile may include a one-dimensional compensation profile indicating compensation values for regions of the display along one direction, or a two-dimensional compensation profile indicating compensation values for regions of a surface of the display.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
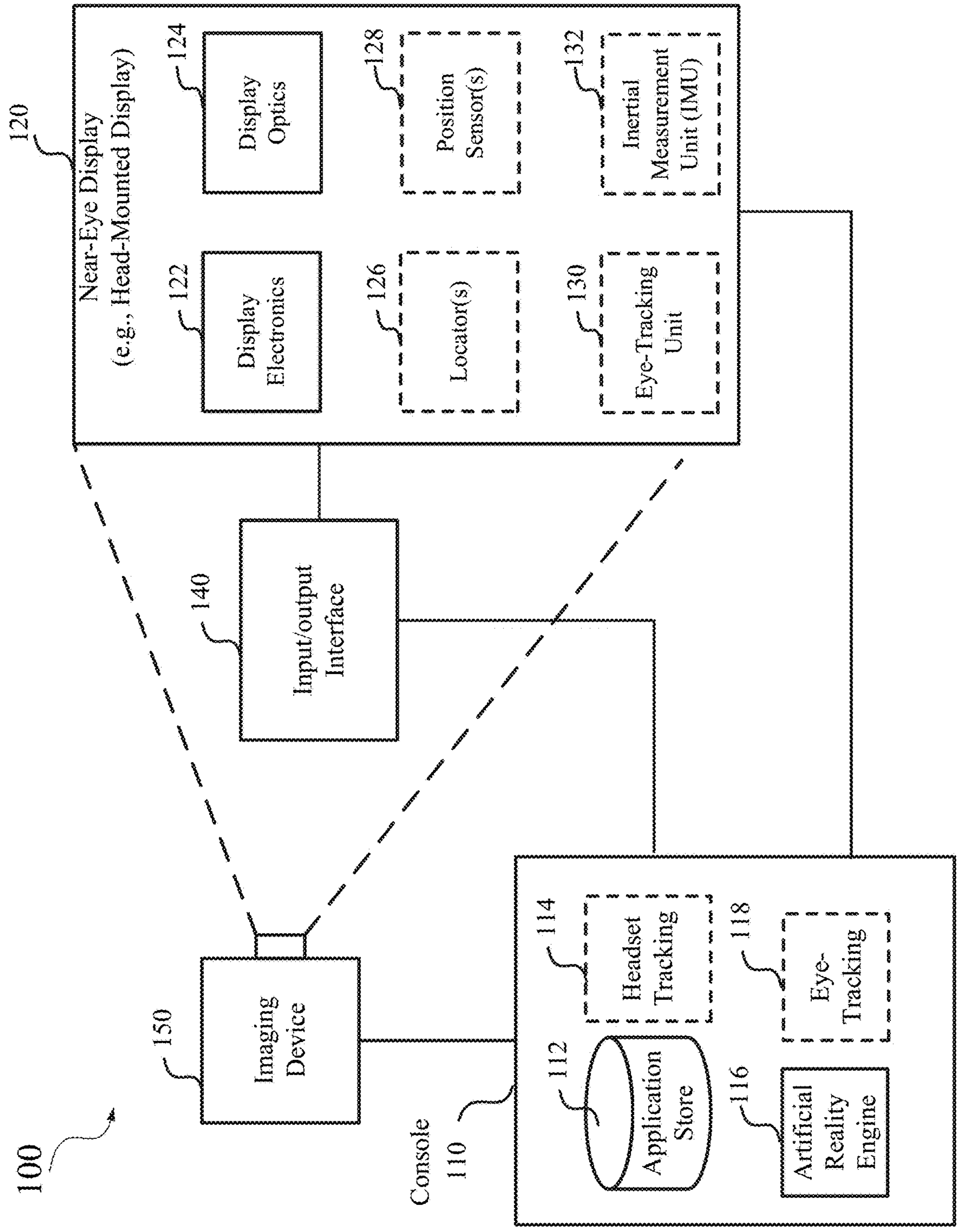
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to near-eye displays or head-mounted displays. More specifically, and without limitation, techniques disclosed herein relate to compensating the brightness nonuniformity and/or brightness roll-off (BRO) of a near-eye display. Various inventive embodiments are described herein, including devices, systems, methods, structures, materials, processes, methods, and the like.

Display panels are generally designed to have uniform brightness properties, where the light beam emitted by each region of the display panel may have a certain (e.g., Gaussian) beam intensity profile with the peak luminance direction perpendicular to the display panel. The user's viewing angles and the chief ray angles (CRAs) for different regions or different fields of view (FOVs) of the display panel may vary across the display panel. For example, the view angle or chief ray for the center region of an LCD panel may be in the surface-normal direction of the LCD panel, but the view angles or chief rays for other regions of the LCD panel may be tilted at different angles with respect to the surface-normal direction of the LCD panel. The mismatch between the display peak luminance angle (e.g., surface-normal direction) and the chief ray angle may lead to brightness variations, which may also vary with the user's gaze direction. The phenomenon of perceived brightness changes or brightness non-uniformity across the field of view (FOV) of a near-eye display (e.g., VR, AR, or MR) device may be referred to as Brightness Roll-Off (BRO) effect, which may result in a perceived FOV narrower than the designed FOV.

There may be several different types of BRO effects, such as instantaneous BRO, gaze BRO, and L-R disparity BRO, depending on how a user gazes at the display and/or what the user perceives. Instantaneous BRO may refer to perceived brightness changes or non-uniformity across the FOV with a static gaze at the center of the display (on-axis). Gaze BRO may refer to perceived brightness changes or non-uniformity across the FOV that may become stronger when the user's gaze direction moves to large off-axis angles from the center of the display. L-R disparity BRO may refer to the perceived non-uniformity discrepancy between the left and right eyes due to the display manufacturing variance. BRO effects may be compensated by lowering the brightness of brighter areas of a display and/or brightening the dimmer areas of the display, such that the brightness uniformity across the FOV may be improved. There may be several factors that could contribute to BRO. For example, there may be no display panel with perfect spatial and angular brightness uniformity. In addition, display optics (e.g., a pancake lens) may, by its design, introduce up to about 15% brightness drop at about 30° FOV angle even with a perfectly uniform display. Therefore, it can be difficult to compensate the brightness nonuniformity of a display system that includes both the display panel and the display optics.

According to certain embodiments, more accurate compensation of the brightness nonuniformity of a near-eye display may be achieved by measuring the display brightness emission profile of the near-eye display and compensating the brightness nonuniformity using a compensation profile implemented using software (e.g., by modifying the image data using a mask) or hardware (e.g., by controlling the brightness of the light sources of the blacklight unit of a liquid crystal display (LCD), or the pixels of an organic light-emitting diode (OLED) or micro-light emitting diode (micro-LED) display).

In one example, a one-dimensional (1-D) or two-dimensional (2-D) display brightness emission profile of a display panel or a display panel with display optics (e.g., a lens) may be generated by measuring the brightness from different angles using a tester that is capable of measuring brightness from different off-axis angles. In some implementations, a 1-D display brightness emission profile may be selected over a 2-D display brightness emission profile to reduce measurement time and because the user's eyes may be less sensitive to brightness changes along the vertical direction. In some implementations, a 2-D display brightness emission profile may be selected over a 1-D display brightness emission profile. In some embodiments, different display brightness emission profiles may be generated for different gazing angles. A compensation profile for the display may then be determined based on the 1-D or 2-D display brightness emission profile. For example, if a display appears to be dimmer on the left side than on the right side, the compensation profile for the display may be generated to compensate the left side in particular. The compensation profile may be implemented using, for example, a software approach, or a hardware approach if the display is a locally dimmable LCD display or an OLED display. For example, the hardware-based compensation profile may be implemented by directly controlling the brightness of each dimmable LED zone on the backlight unit of an LCD display or each pixel on an OLED display. Alternatively, the compensation profile may be implemented using a software approach, where the compensation profile may be implemented as an image mask that may be placed in the graphics pipeline to modify the image data sent to the display panel.

In some HMDs, a pair of display panels may be placed in a tilted way rather than in a parallel way. Thus, the horizontal axes of the individual display panels may not match the horizontal axis of the whole HMD. As such, if the BRO effect is more severe along the horizontal axis of the HMD rather than the horizontal axes of individual display panels, the compensation profile may be geometrically corrected according to the display brightness emission profile along the direction of the horizontal axis of the HMD.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to function as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light-emitting diode (LED), a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 12 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 120 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking subsystem 114, an artificial reality engine 116, and an eye-tracking subsystem 118. Some embodiments of console 110 may include different or additional devices or subsystems than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the devices or subsystems of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking subsystem 114 may track movements of near-eye display 120 using slow calibration information from external imaging device 150. For example, headset tracking subsystem 114 may determine positions of a reference point of near-eye display 120 using observed locators from the slow calibration information and a model of near-eye display 120. Headset tracking subsystem 114 may also determine positions of a reference point of near-eye display 120 using position information from the fast calibration information. Additionally, in some embodiments, headset tracking subsystem 114 may use portions of the fast calibration information, the slow calibration information, or any combination thereof, to predict a future location of near-eye display 120. Headset tracking subsystem 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking subsystem 114. Artificial reality engine 116 may also receive estimated eye position and orientation information from eye-tracking subsystem 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking subsystem 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking subsystem 118 to more accurately determine the eye's orientation.

Figure 2:
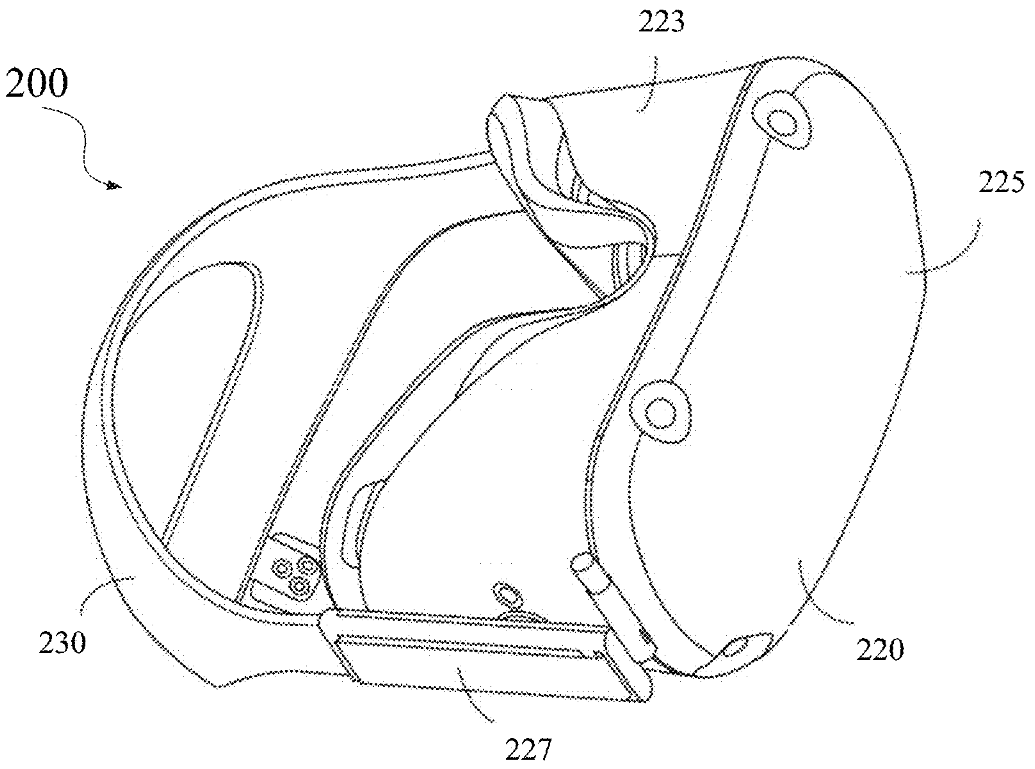
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
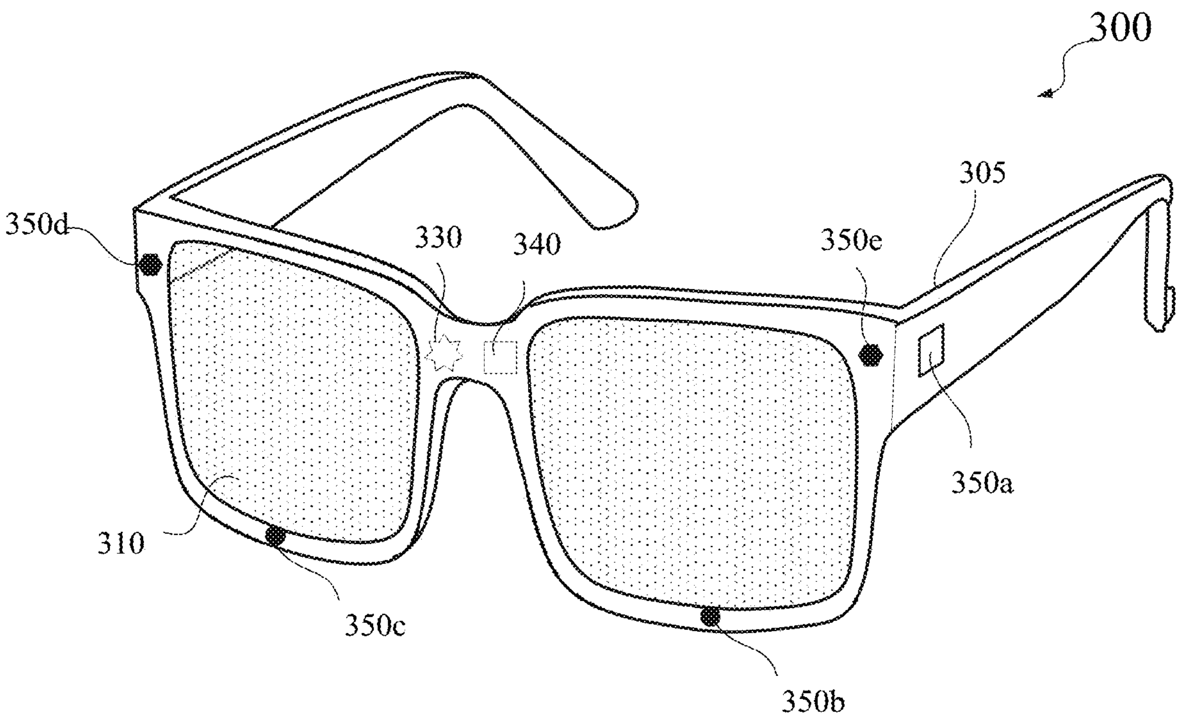
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350*a*, 350*b*, 350*c*, 350*d*, and 350*e* on or within frame 305. In some embodiments, sensors 350*a*-350*e* may include one or more depth sensors, motion sensors, position sensors, inertial sensors, or ambient light sensors. In some embodiments, sensors 350*a*-350*e* may include one or more image sensors configured to generate image data representing different fields of views in different directions. In some embodiments, sensors 350*a*-350*e* may be used as input devices to control or influence the displayed content of near-eye display 300, and/or to provide an interactive VR/AR/MR experience to a user of near-eye display 300. In some embodiments, sensors 350*a*-350*e* may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350*a*-350*e* in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. High-resolution camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
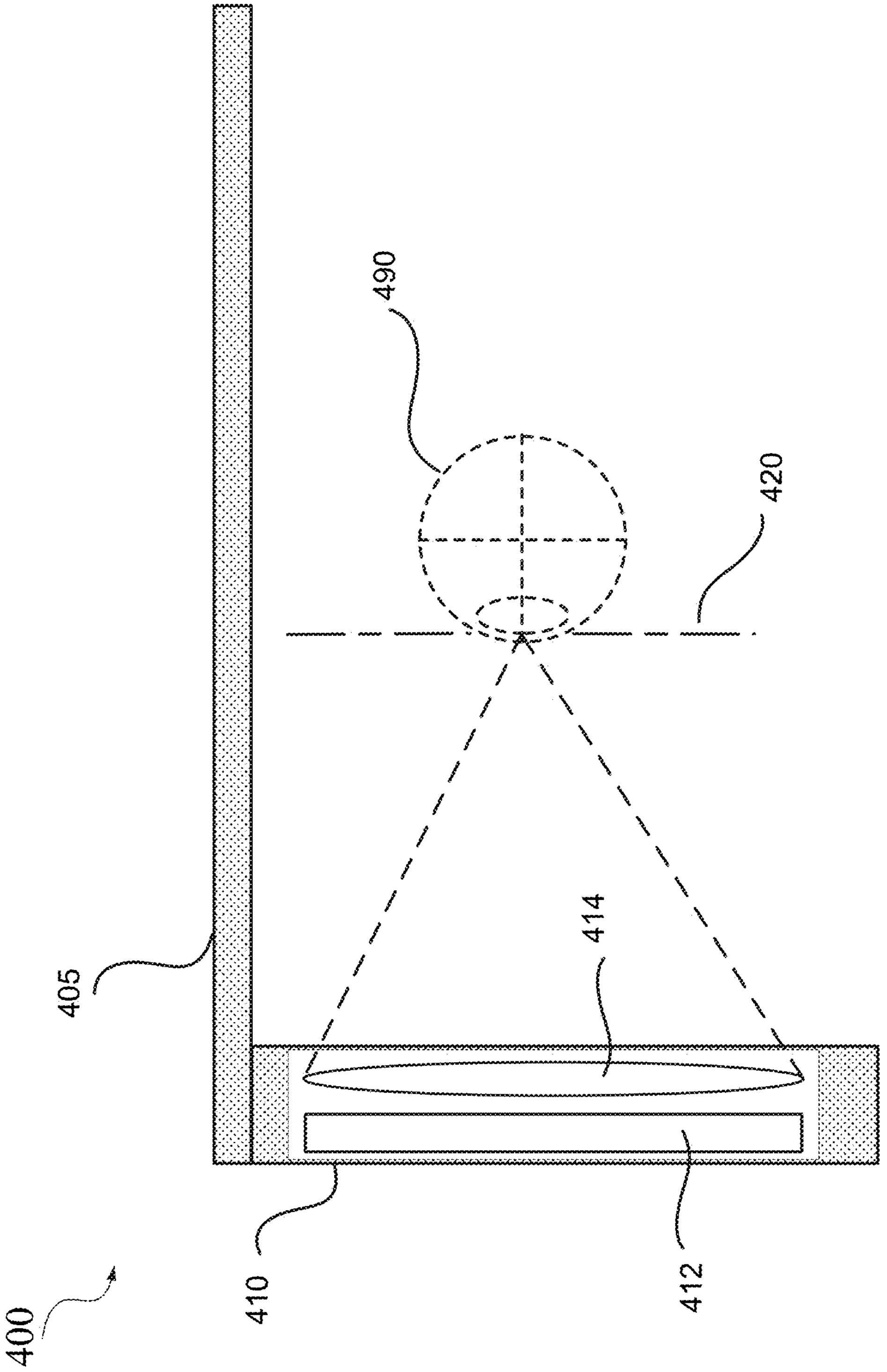
FIG. 4 is a cross-sectional view of an example of a near-eye display according to certain embodiments.

FIG. 4 is a cross-sectional view of an example of a near-eye display 400 according to certain embodiments. Near-eye display 400 may include at least one display assembly 410. Display assembly 410 may be configured to direct image light (e.g., display light) to an eyebox located at an exit pupil 420 and to user's eye 490. It is noted that, even though FIG. 4 and other figures in the present disclosure show an eye of a user of the near-eye display for illustration purposes, the eye of the user is not a part of the corresponding near-eye display.

As HMD device 200 and near-eye display 40, near-eye display 400 may include a frame 405 and display assembly 410 that may include a display 412 and/or display optics 414 coupled to or embedded in frame 405. As described above, display 412 may display images to the user electrically (e.g., using LCDs, LEDs, OLEDs) or optically (e.g., using a waveguide display and optical couplers) according to data received from a processing unit, such as console 110. In some embodiments, display 412 may include a display panel that includes pixels made of LCDs, LEDs, OLEDs, and the like. Display 412 may include sub-pixels to emit light of a predominant color, such as red, green, blue, white, or yellow. In some embodiments, display assembly 410 may include a stack of one or more waveguide displays including, but not restricted to, a stacked waveguide display, a varifocal waveguide display, and the like. The stacked waveguide display may be a polychromatic display (e.g., a red-green-blue (RGB) display) created by stacking waveguide displays whose respective monochromatic sources are of different colors.

Display optics 414 may be similar to display optics 124 and may display image content optically (e.g., using optical waveguides and optical couplers), correct optical errors associated with the image light, combine images of virtual objects and real objects, and present the corrected image light to exit pupil 420 of near-eye display 400, where the user's eye 490 may be located. In some embodiments, display optics 414 may also relay the images to create virtual images that appear to be away from display 412 and further than just a few centimeters away from the eyes of the user. For example, display optics 414 may collimate the image source to create a virtual image that may appear to be far away (e.g., greater than about 0.3 m, such as about 0.5 m, 1 m, or 3 m away) and convert spatial information of the displayed virtual objects into angular information. In some embodiments, display optics 414 may also magnify the source image to make the image appear larger than the actual size of the source image. More details of display 412 and display optics 414 are described below.

In various implementations, the optical system of a near-eye display, such as an HMD, may be pupil-forming or non-pupil-forming. Non-pupil-forming HMDs may not use intermediary optics to relay the displayed image, and thus the user's pupils may serve as the pupils of the HMD. Such non-pupil-forming displays may be variations of a magnifier (sometimes referred to as "simple eyepiece"), which may magnify a displayed image to form a virtual image at a greater distance from the eye. The non-pupil-forming display may use fewer optical elements. Pupil-forming HMDs may use optics similar to, for example, optics of a compound microscope or telescope, and may include some forms of projection optics that magnify an image and relay it to the exit pupil.

Figure 5:
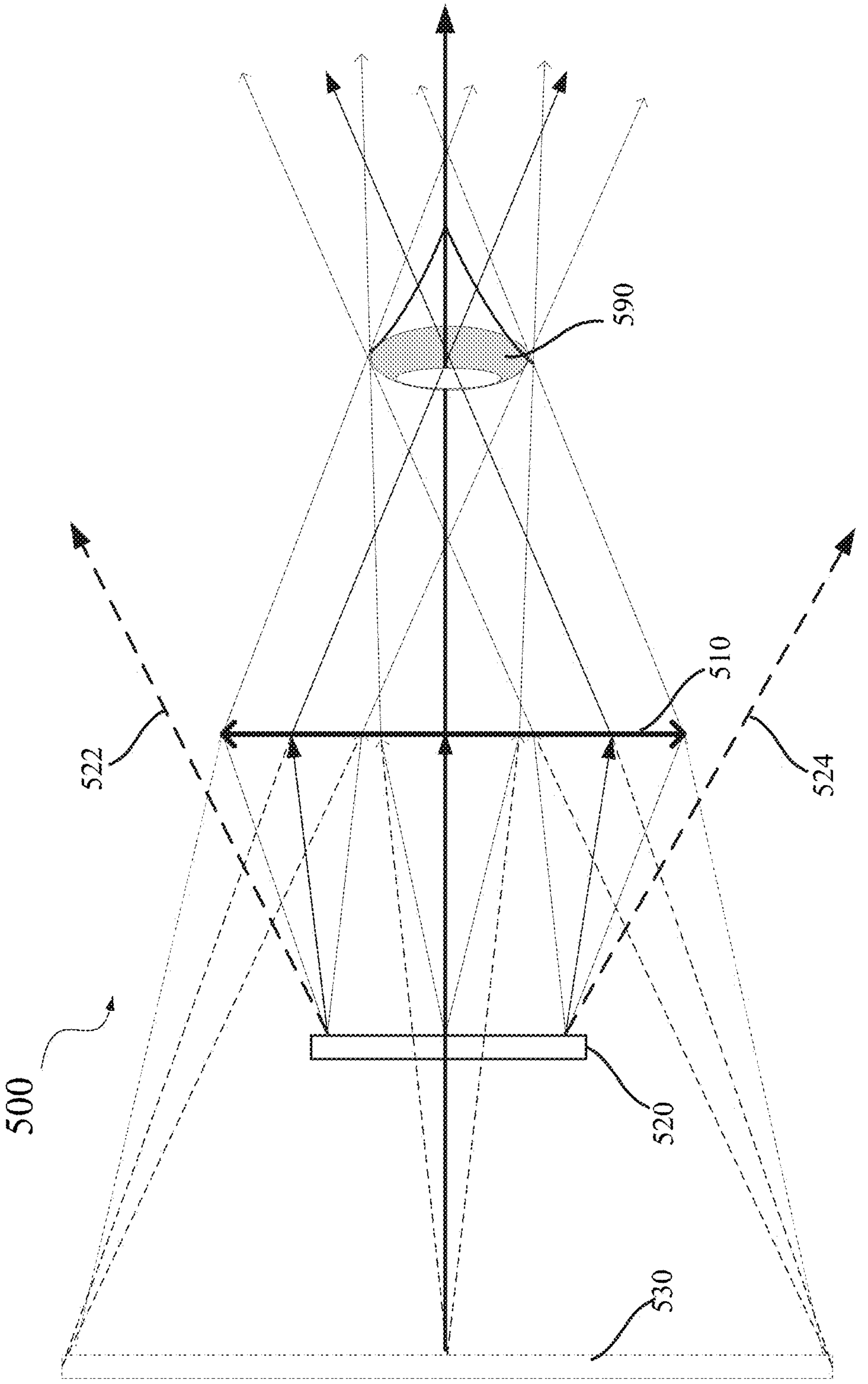
FIG. 5 illustrates an example of an optical system with a non-pupil forming configuration for a near-eye display device according to certain embodiments.

FIG. 5 illustrates an example of an optical system 500 with a non-pupil forming configuration for a near-eye display device according to certain embodiments. Optical system 500 may be an example of near-eye display 400 and may include display optics 510 and an image source 520 (e.g., a display panel). Display optics 510 may function as a magnifier. FIG. 5 shows that image source 520 is in front of display optics 510. In some other embodiments, image source 520 may be located outside of the field of view of the user's eye 590. For example, one or more deflectors or directional couplers may be used to deflect light from an image source to make the image source appear to be at the location of image source 520 shown in FIG. 5. Image source 520 may be an example of display 412 described above. For example, image source 520 may include a two-dimensional array of light emitters, such as semiconductor micro-LEDs or micro-OLEDs. The dimensions and pitches of the light emitters in image source 520 may be small. For example, each light emitter may have a diameter less than 2 μm (e.g., about 1.2 μm) and the pitch may be less than 2 μm (e.g., about 1.5 μm). As such, the number of light emitters in image source 520 can be equal to or greater than the number of pixels in a display image, such as 960×720, 1280×720, 1440×1080, 1920×1080, 2160×1080, or 2560×1080 pixels. Thus, a display image may be generated simultaneously by image source 520.

Light from an area (e.g., a pixel or a light emitter) of image source 520 may be directed to a user's eye 590 by display optics 510. Light directed by display optics 510 may form virtual images on an image plane 530. The location of image plane 530 may be determined based on the location of image source 520 and the focal length of display optics 510. A user's eye 590 may form a real image on the retina of user's eye 590 using light directed by display optics 510. In this way, objects at different spatial locations on image source 520 may appear to be objects on an image plane far away from user's eye 590 at different viewing angles. Image source 520 may have a size larger or smaller than the size (e.g., aperture) of display optics 510. Some light emitted from image source 520 with large emission angles (as shown by light rays 522 and 524) may not be collected and directed to user's eye 590 by display optics 510 and may become stray light.

Figure 6:
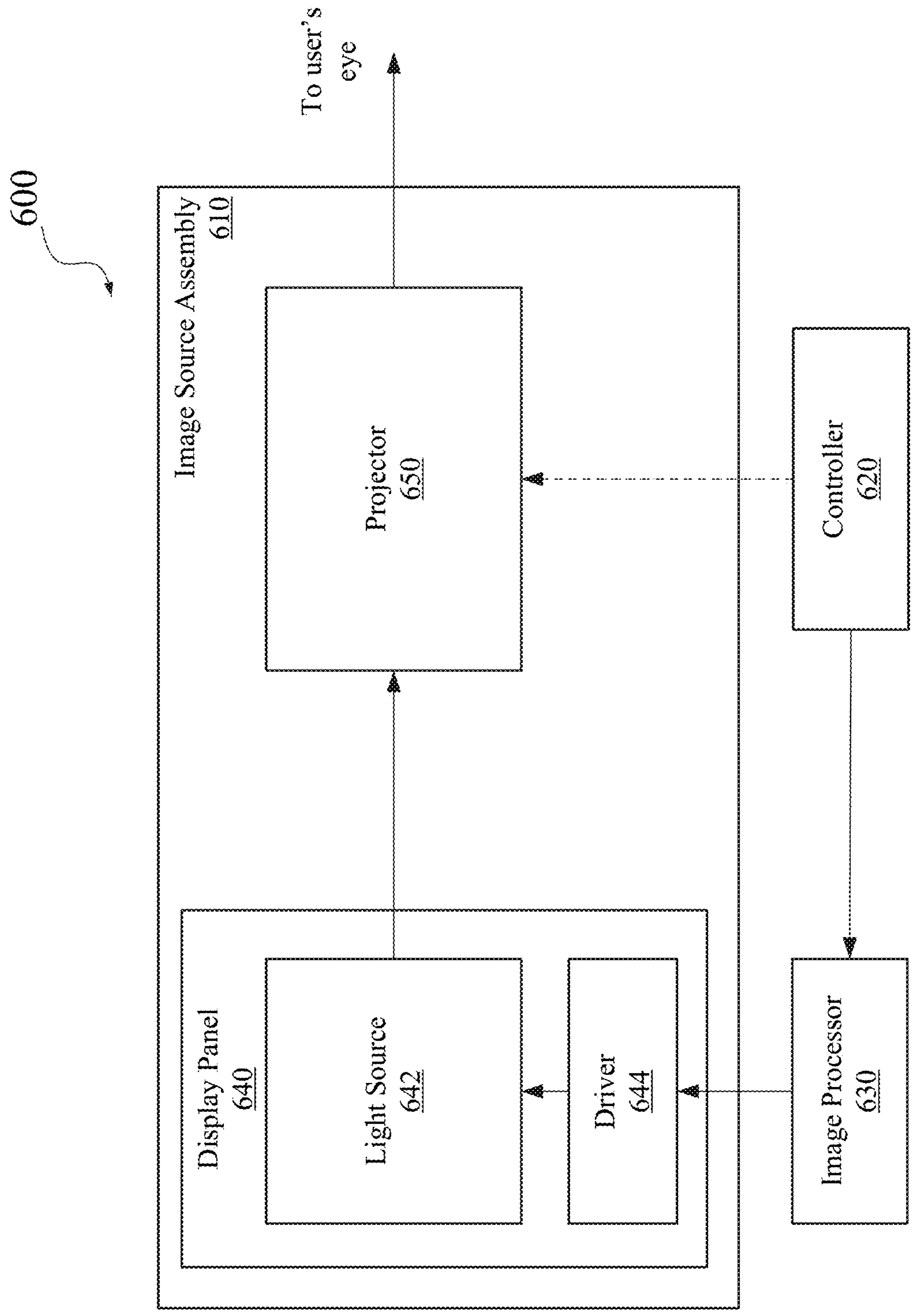
FIG. 6 illustrates an example of an image source assembly in a near-eye system according to certain embodiments.

FIG. 6 illustrates an example of an image source assembly 610 in a near-eye display system 600 according to certain embodiments. Image source assembly 610 may include, for example, a display panel 640 that may generate display images to be projected to a user's eyes, and a projector 650 that may project the display images generated by display panel 640 to the user's eye. Display panel 640 may include a light source 642 and a drive circuit 644 for controlling light source 642. Light source 642 may include, for example, LEDs, OLEDs, micro-OLEDs, micro-LEDs, resonant cavity light emitting diodes (RC-LEDs), or other light emitters. Projector 650 may include, for example, a diffractive optical element, a freeform optical element, a scanning mirror, and/or other display optics. In some embodiments, near-eye display system 600 may also include a controller 620 that synchronously controls light source 642 and projector 650 (e.g., including a scanner). Image source assembly 610 may generate and output an image to user's eyes.

Light source 642 may include a plurality of light emitters arranged in an array or a matrix. Each light emitter may emit monochromatic light, such as red light, blue light, green light, infra-red light, and the like. While RGB colors are often used, embodiments described herein are not limited to using red, green, and blue as primary colors. Other colors can also be used as the primary colors of near-eye display system 600. In some embodiments, a display panel in accordance with an embodiment may use more than three primary colors. Each pixel in light source 642 may include three subpixels that include a red LED, a green LED, and a blue LED. A semiconductor LED generally includes an active light emitting layer within multiple layers of semiconductor materials. The multiple layers of semiconductor materials may include different compound materials or a same base material with different dopants and/or different doping densities. For example, the multiple layers of semiconductor materials may include an n-type material layer, an active region that may include hetero-structures (e.g., one or more quantum wells), and a p-type material layer.

Controller 620 may control the image rendering operations of image source assembly 610, such as the operations of light source 642 and/or projector 650. For example, controller 620 may determine instructions for image source assembly 610 to render one or more display images. The instructions may include display instructions and/or scanning instructions. In some embodiments, the display instructions may include an image file (e.g., a bitmap file). The display instructions may be received from, for example, a console, such as console 110 described above with respect to FIG. 1. Controller 620 may include a combination of hardware, software, and/or firmware not shown here so as not to obscure other aspects of the present disclosure. In some embodiments, controller 620 may be a graphics processing unit (GPU) of a display device. In other embodiments, controller 620 may be other kinds of processors.

Image processor 630 may be a general-purpose processor and/or one or more application-specific circuits that are dedicated to performing the features described herein. In one example, a general-purpose processor may be coupled to a memory to execute software instructions that cause the processor to perform certain processes described herein. In another embodiment, image processor 630 may be one or more circuits that are dedicated to performing certain features. While image processor 630 in FIG. 6 is shown as a stand-alone unit that is separate from controller 620 and drive circuit 644, image processor 630 may be a sub-unit of controller 620 or drive circuit 644 in other embodiments. In other words, in those embodiments, controller 620 or drive circuit 644 may perform various image processing functions of image processor 630. Image processor 630 may also be referred to as an image processing circuit.

In the example shown in FIG. 6, light source 642 may be driven by drive circuit 644, based on data or instructions (e.g., display and scanning instructions) sent from controller 620 or image processor 630. In one embodiment, drive circuit 644 may include a circuit panel that connects to and mechanically holds various light emitters of light source 642. Light source 642 may emit light in accordance with one or more illumination parameters that are set by the controller 620 and potentially adjusted by image processor 630 and drive circuit 644. The illumination parameters may be used by light source 642 to generate light. The illumination parameters may include, for example, source wavelength, pulse rate, pulse amplitude, beam type (continuous or pulsed), other parameter(s) that may affect the emitted light, or any combination thereof. In some embodiments, the source light generated by light source 642 may include multiple beams of red light, green light, and blue light, or any combination thereof.

Projector 650 may perform a set of optical functions, such as focusing, combining, conditioning, or scanning the image light generated by light source 642. In some embodiments, projector 650 may include a combining assembly, a light conditioning assembly, or a scanning mirror assembly. Projector 650 may include one or more optical components that optically adjust and potentially re-direct the light from light source 642. One example of the adjustment of light may include conditioning the light, such as expanding, collimating, correcting for one or more optical errors (e.g., field curvature, chromatic aberration, etc.), some other adjustments of the light, or any combination thereof. The optical components of projector 650 may include, for example, lenses, mirrors, apertures, gratings, polarizers, waveplates, prisms, or any combination thereof.

As described above, display panels are generally designed to have uniform viewing angle properties, where the light beam emitted by each region of the display panel may have a certain (e.g., Gaussian) beam profile with the peak luminance direction perpendicular to the display panel. However, in near-eye display systems, the user's viewing angles and the chief-ray angles (CRAs) for different regions or different FOVs of a display panel (e.g., LCD or OLED display panel) may vary across the display panel. For example, the view angle or chief ray for the center region of an LCD panel may be in the surface-normal direction of the LCD panel, but the view angle or chief ray for other regions of the LCD panel may be tilted at different angles with respect to the surface-normal direction of the LCD panel. The mismatch between the display peak luminance angle and the view angle or chief ray angle may lead to brightness variations, which may also vary with the user's gaze direction.

A near-eye display may also include display optics (e.g., including a Fresnel lens or pancake lens) that collect display light from the display panels and project the displayed images to user's eyes. For example, pancake optics may often be used in near-eye display to achieve thin and light form factor. However, the light collection efficiency of pancake lens may strongly depend on the emission profile of the display and the location of the light emission region. For example, a pancake lens may introduce up to about 15% brightness drop at about 30° FOV angle even with a perfectly uniform display. Therefore, there may be a perceived brightness drop due to the brightness drop at larger FOV or view angles, in addition to the mismatch between the lens collection angle and the display light emission angle that may have a limited full-width half-magnitude (FWHM) range. For example, when the eye fixates at about 0°, due to the different chief ray angles of the pixels and the different light collection cones of the display optics for different pixels, pixels at peripheral regions may appear dimmer than the pixels at the center of the optical axis, even if these pixels have the same brightness. When the eye fixates at about +30°, the chief ray angles and the light collection cones for the pixels of the display panel may change, and thus the perceived brightness for different regions may change as well.

Therefore, the perceived brightness may vary depending on the FOVs and the user's gaze directions. This phenomenon of perceived brightness changes or brightness non-uniformity across the FOV of a near-eye display (e.g., VR, AR, or MR) device may be referred to as the brightness roll-off (BRO) effect, and may result in a perceived FOV narrower than the target FOV.

Figure 7:
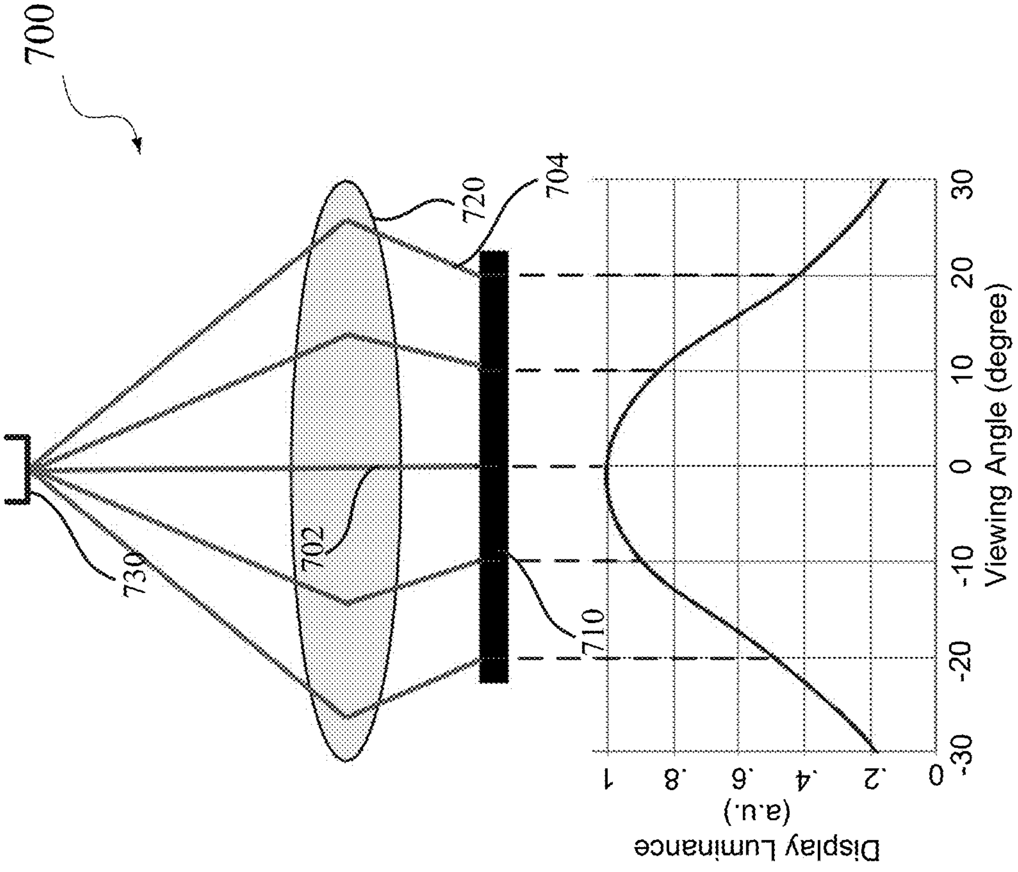
FIG. 7 illustrates an example of a relationship between the display luminance and the field of view of a near-eye display that includes a display panel and viewing optics.

FIG. 7 illustrates an example of a relationship between the display luminance and the FOV (and chief-ray angle) of a near-eye display 700 that includes a display panel 710 and viewing optics 720. FIG. 7 also shows an exit pupil 730 of near-eye display 700, a chief ray 702 for the center region of display panel 710, and a chief ray 704 for a peripheral region of display panel 710. The direction of chief ray 702 for the center region (FOV angle about) 0° of display panel 710 may match the peak luminance direction (e.g., the surface-normal direction) of display panel 710, and thus the portion of the light emitted by the center region of display panel 710 that reaches exit pupil 730 of near-eye display 700 may have a higher intensity. Therefore, the center region of display panel 710 may appear to have a higher brightness to the user's eye. The direction of chief ray 704 for the peripheral region (with large FOV angle) of display panel 710 may not match the peak luminance direction of display panel 710, and thus the portion of the light emitted by the peripheral region of display panel 710 that reaches exit pupil 730 of near-eye display 700 may have a lower intensity. Therefore, the peripheral region of display panel 710 may appear to have a lower brightness to the user's eye.

Figure 8C:
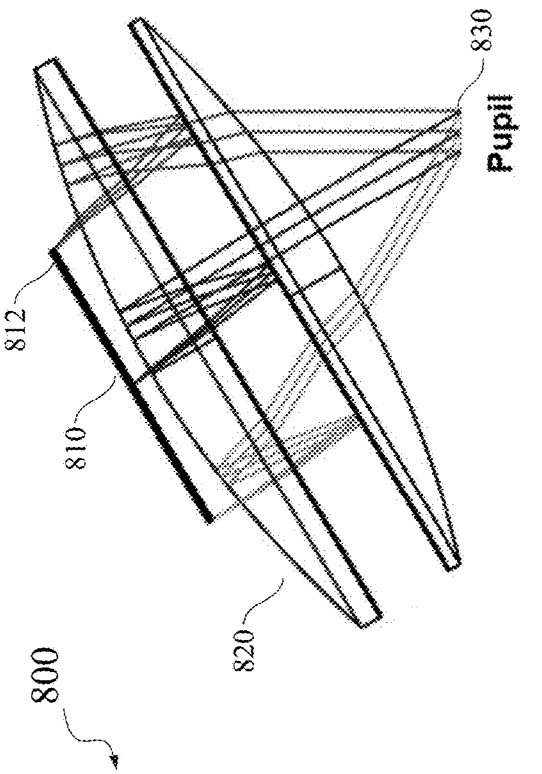
FIG. 8C illustrates the example of near-eye display of FIG. 8A viewed by a user's eye having a gazing angle about 30°.
Figure 8D:
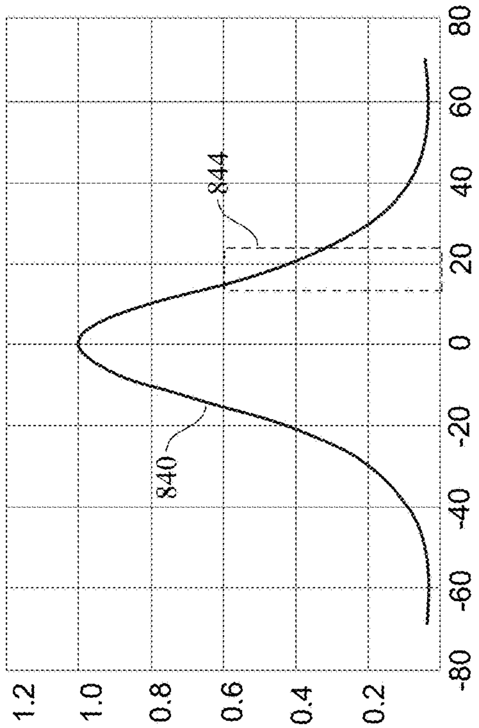
FIG. 8D illustrates an example of the intensity of the light emitted from a right region of the display panel and collected by display optics in the near-eye display of FIG. 8A when the user's gazing angle is about 30°.
Figure 8A:
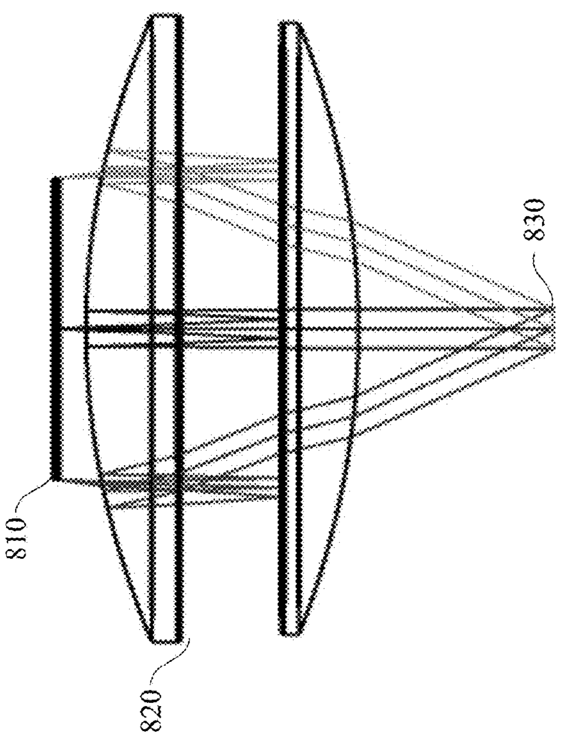
FIG. 8A illustrates an example of a near-eye display viewed by a user's eye having a gazing angle about 0°.

FIG. 8A illustrates an example of a near-eye display 800 viewed by a user's eye having a gazing angle about 0°. In the illustrated example, near-eye display 800 includes a display panel 810 (e.g., an LCD or OLED panel) and display optics 820 (e.g., a folded lens such as a pancake lens), which may project images generated by display panel 810 onto a pupil 830. As shown in FIG. 8A, at each region of display panel 810, light within a certain collection cone may be collected and projected to the pupil and the user's eye by display optics 820. The chief ray angle and the collection cone may be different at different regions of display panel 810. In the illustrated example, the gazing angle of the user's eye is at about 0°, the chief ray angle of a center region of display panel 810 may be about 0° and the collection cone for the center region may be about 8.5°, whereas the chief ray angle of a peripheral region of display panel 810 may be about 6.5°, and the collection cone for the peripheral region may be about 8.5°.

Figure 8B:
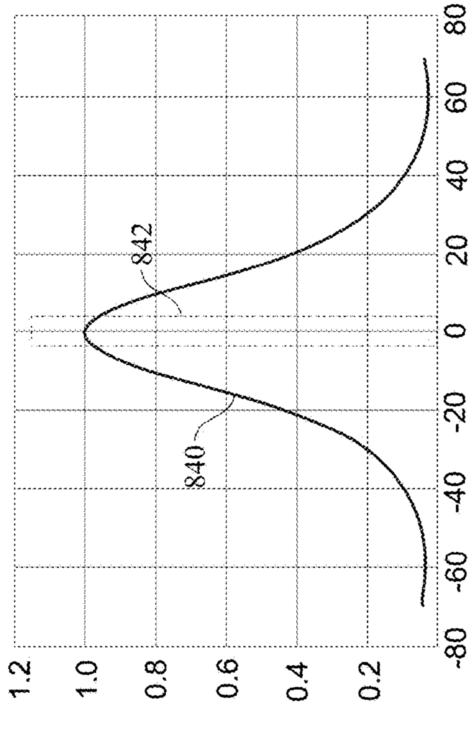
FIG. 8B illustrates an example of a beam profile of the light beam emitted at each region of the display panel of FIG. 8A.

FIG. 8B illustrates an example of a beam profile 840 of the light beam emitted at each region of display panel 810. Beam profile 840 may have, for example, a Gaussian beam profile, with the peak luminance direction in a surface-normal direction (perpendicular to display panel 810). For a center region of display panel 810, when the gazing angle of the user's eye is at 0°, the chief ray angle may match the peak intensity direction, and thus the collected light may be in a region 842 in FIG. 8 and may have higher energy. When the chief ray angle for a region (e.g., a peripheral region) of display panel is not at zero degree (with a FOV angle greater than) 0° with respect to the surface-normal direction, light in the peak intension direction may not be collected, and thus the total energy of the collected light may be lower even if the collection cone is about the same. The larger the mismatch between the chief ray angle and the peak intensity direction, the lower the total energy of the collected light may be.

FIG. 8C illustrates the example of near-eye display 800 viewed by a user's eye having a gazing angle about 30°. As shown in FIG. 8C, at each region of display panel 810, only light within a certain collection cone may be projected to the pupil and the user's eye. The chief ray angle and the collection cone may be different at different regions of display panel 810. The chief ray angle and the collection cone for a same pixel may also vary with the gazing angle. In the illustrated example, the gazing angle of the user's eye is at about 30°, the chief ray angle of a center region of display panel 810 may be about 11° and the collection cone for the center region may be about 6.5°, the chief ray angle of a left region of display panel 810 may be about 2.8° and the collection cone for the left region may be about 4°, whereas the chief ray angle of a right region 812 of display panel 810 may be about 20° and the collection cone for the right region 812 may be about 9°.

FIG. 8D illustrates an example of the intensity of the light emitted from a right region 812 of display panel 810 and collected by display optics in near-eye display 800 when the user's gazing angle is about 30°. FIG. 8D also shows the beam profile 840 of the light beam emitted at each region of display panel 810. As shown in FIG. 8C, a right portion of the light beam emitted from the right region 812 of display panel 810 may be collected and displayed to the user's eye by display optics 820. A region 844 of the beam profile shows the portion of the light emitted from the right region 812 of display panel 810 and collected by display optics 820 in near-eye display 800 when the user's gazing angle is about 30°. As shown by region 844 in FIG. 8D, even though the collection cone may be larger (e.g., about 9°), the light intensity in region 844 may be much lower than the peak value due to large CRA (e.g., about) 20°, and thus the total energy of the collected light may be low. As such, the light intensity perceived by the user's eye may be different for different regions of display panel 810, which may also vary as the gazing angle of the user's eye changes.

When the FWHM angular range of the beam profile is large, even if there is some mismatch between the chief ray angle and the peak intensity direction, the total energy of the light collected by display optics 820 from different regions of display panel 810 may still be relatively uniform because the light intensity around the chief ray angle may still be sufficiently high. However, the light efficiency of the near-eye display may be low because a large portion of the emitted light having high intensity is outside of the collection cone.

There may be several types of BRO effects, such as instantaneous BRO, gaze BRO, and L-R disparity BRO, depending on how a user gazes at the display and/or what the user perceives. Instantaneous BRO may refer to perceived brightness changes or non-uniformity across the FOV with a static gaze at the center of the display (on-axis). Gaze BRO may refer to perceived brightness changes or non-uniformity across the FOV that may become stronger when the user's gaze direction moves to large off-axis angles from the center of the display. L-R disparity BRO may refer to the perceived non-uniformity discrepancy between the left and right eyes due to the display manufacturing variance.

Figure 9A:
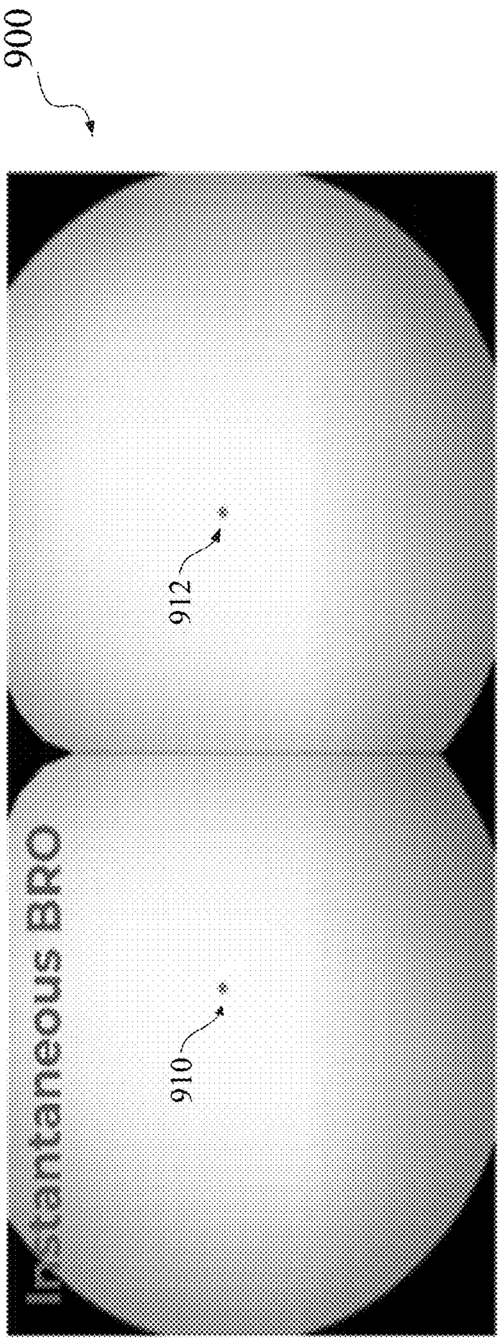
FIG. 9A illustrates an example of instantaneous brightness roll-off (BRO).

FIG. 9A includes a diagram 900 illustrating an example of instantaneous brightness roll-off (BRO). In the illustrated example, a point 910 shows the gazing point of the user's left eye, which may be the center of the left display. A point 912 in FIG. 9A shows the gazing point of the user's right eye, which may be the center of the right display. As illustrate, the intensity of the displayed image perceived by the user's eyes may be the highest in the center region, and may decrease towards the peripheral regions (e.g., left and right edges).

Figure 9B:
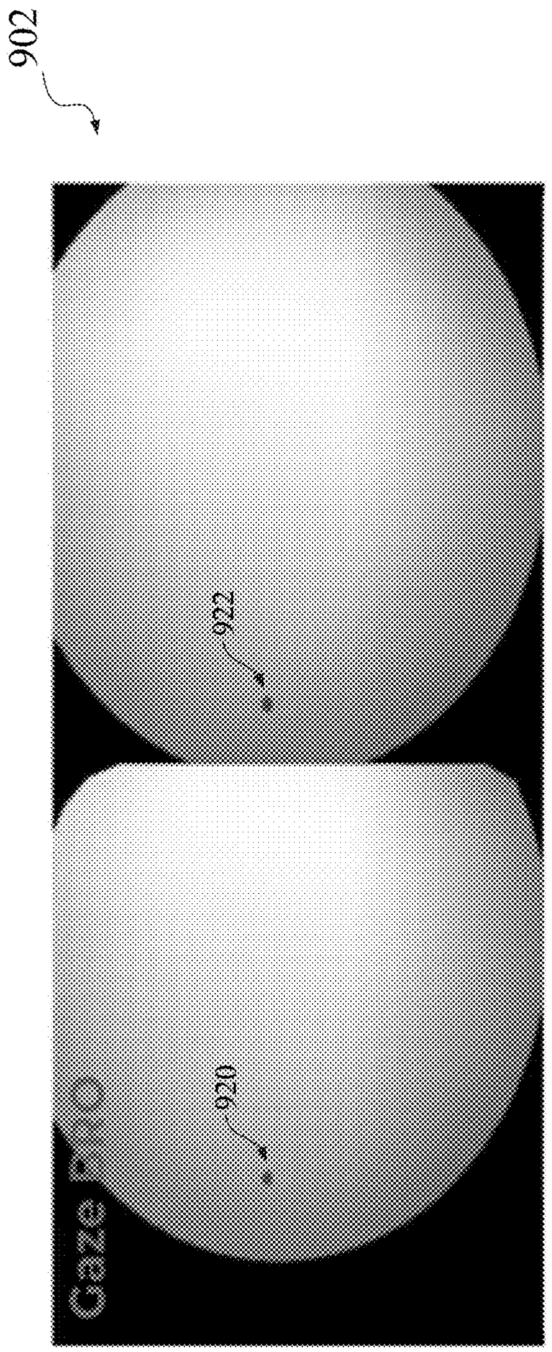
FIG. 9B illustrates an example of gaze BRO.

FIG. 9B includes a diagram 902 illustrating an example of gaze BRO. In the illustrated example, a point 920 shows the gazing point of the user's left eye, which may be at a left edge of the left display. A point 922 in FIG. 9B shows the gazing point of the user's right eye, which may be at the right edge of the right display. As illustrate, the intensity of the displayed image perceived by the user's eyes may not be uniform and may be different from the intensity of the perceived displayed image when the user's gaze point is at the center of the display.

BRO compensation may be performed by, for example, lowering the brightness of brighter areas of a display and/or brightening the dimmer areas of the display, such that the brightness uniformity across the FOV may be improved. But there may be several factors that may contribute to BRO and make the compensation complex and difficult. For example, there may be no display panel with perfect spatial and angular brightness uniformity. In addition, display optics (e.g., a pancake lens) may, by its design, introduce brightness drop at large FOV angles (e.g., up to about 15% brightness drop at about 30° FOV angle) due to, for example, the angle-dependent reflectivity of the partial reflector that may vary with the incident angle, even with a perfectly uniform display. Therefore, it can be difficult to compensate the brightness nonuniformity of a display system that includes the display panel and the display optics that both can contribute to the brightness nonuniformity.

According to certain embodiments, more accurate compensation of the brightness nonuniformity of a near-eye display may be achieved by measuring the display brightness emission profile of the near-eye display and compensating the brightness nonuniformity using a compensation profile implemented using software (e.g., by modifying the image data using a mask) or hardware (e.g., by controlling the brightness of the light sources at different regions of the blacklight unit of an LCD display or the pixels of an OLED display).

In some embodiments, a one-dimensional (1-D) or two-dimensional (2-D) display brightness emission profile of a display, with or without display optics (e.g., a lens), may be generated by measuring the brightness from different angles using a tester that is capable of measuring brightness from different off-axis angles. A compensation profile for the display may then be determined based on the 1-D or 2-D display brightness emission profile. In some examples, the compensation profile may be complementary to the display brightness emission profile. For example, if a display appears to be dimmer on the left side than the right side, the compensation profile for the display may be generated to compensate the left side in particular. In some implementations, a 1-D display brightness emission profile may be selected over a 2-D display brightness emission profile for various reasons. For example, experimental results show that people may be less sensitive to brightness changes along the vertical axis, and using a 1-D display brightness emission profile may reduce the measurement time. The compensation profile may thus include a 1-D compensation profile, such as a compensation profile along a horizontal axis of the display. In some implementations, a 2-D display brightness emission profile may be selected over a 1-D display brightness emission profile, and thus the compensation profile may include a 2-D compensation profile that may be complementary to 2-D display brightness emission profile. In some embodiments, different display brightness emission profiles may be generated for different gazing angles.

Figure 10B:
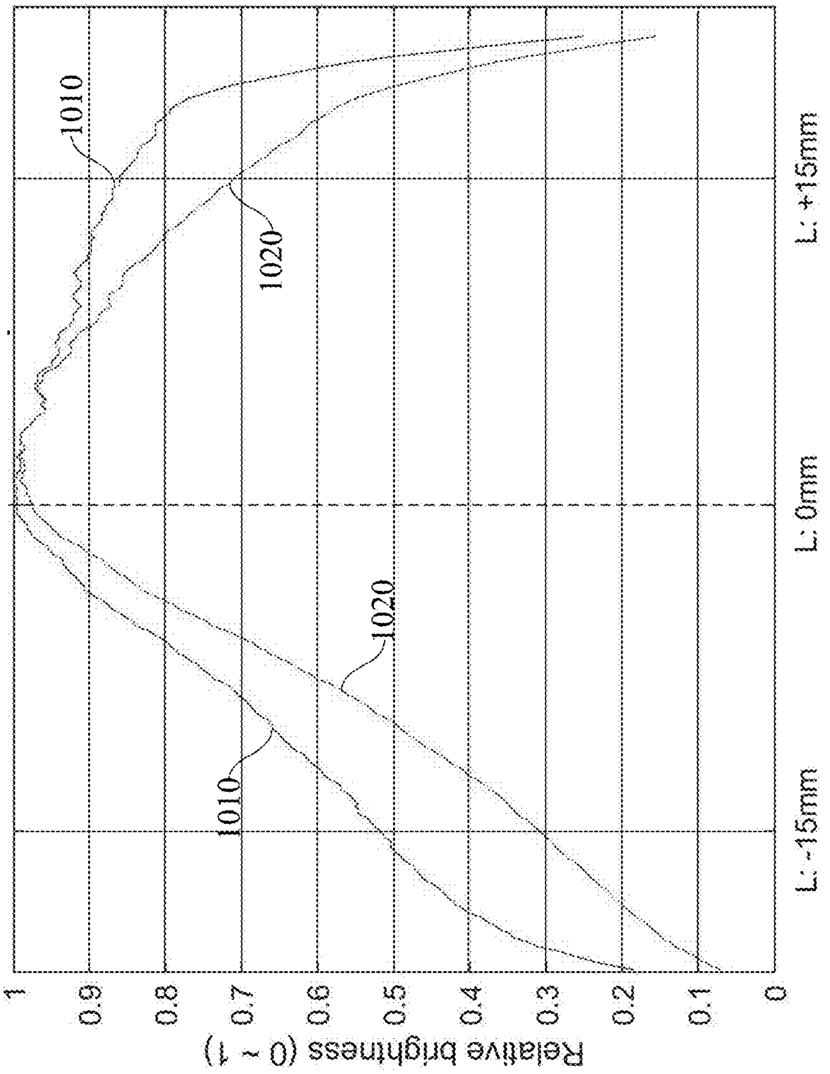
FIG. 10B shows examples of 1-D display brightness emission profiles of examples of display devices.
Figure 10A:
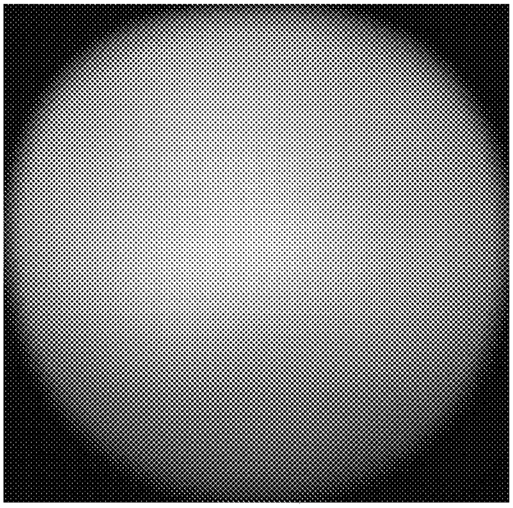
FIG. 10A shows an example of a perceived image displayed by a display that is configured to display an image having uniform pixel data.

FIG. 10A includes a diagram 1000 showing an example of a perceived image displayed by a display that is configured to display an image having uniform pixel data. As illustrated, even if the intensity of the light emitted from different regions of the display is uniform, the image observed by a user may show different intensity levels at different regions of the display.

FIG. 10B includes a diagram 1002 showing examples of 1-D display brightness emission profiles of examples of display devices. The 1-D display brightness emission profiles may be the display brightness emission profiles in a horizontal direction. A curve 1010 in FIG. 10B shows a 1-D display brightness emission profile of a display that may not include display optics or a display where the display optics may not introduce additional brightness nonuniformity. A curve 1020 in FIG. 10B shows a 1-D display brightness emission profile of a display where the display optics may introduce additional brightness nonuniformity such that the brightness at the peripheral regions may be much lower than the brightness at the center regions. Curves 1010 and 1020 shows that the brightness uniformity of the display may reduce from the center region to peripheral regions, where the display brightness emission profiles may not be symmetrical with respect to the center region, and may have an irregular shapes. Therefore, it can be difficult to precisely compensate the brightness nonuniformity.

Figure 11:
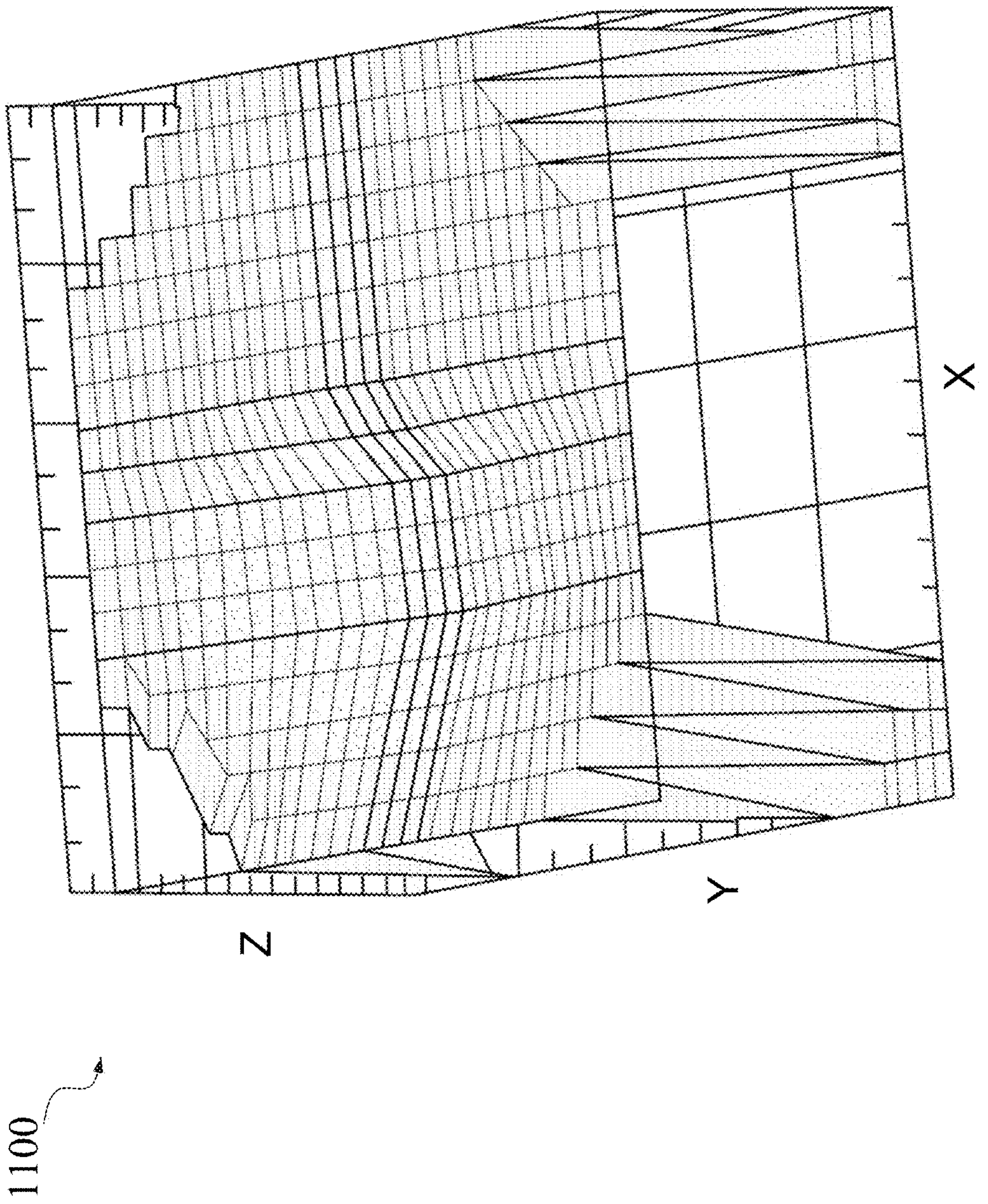
FIG. 11 illustrates an example of a BRO compensation profile.

FIG. 11 includes a diagram 1100 illustrating an example of a BRO compensation profile. The example of the BRO compensation profile may be used to compensate the BRO of a display having the 2-D display brightness emission profile shown in FIG. 10A or the 1-D display brightness emission profiles shown in FIG. 10B. The compensation profile may be implemented using, for example, a software approach, or a hardware approach if the display is a locally dimmable LCD display, an OLED display, or a micro-LED display. For example, the hardware-based compensation profile may be implemented by directly controlling the brightness of each dimmable LED zone on the backlight unit of an LCD display or each pixel on an OLED or micro-LED display. In peripheral regions where the display brightness may be low (and the display brightness emission profile may have relatively low values), the compensation profile may have higher values and the light sources for the regions may have higher brightness (e.g., driven by higher drive current). Alternatively or additionally, the compensation profile may be implemented using a software approach, where the compensation profile may be implemented as an image mask that may be placed in the graphics pipeline to modify the image data sent to the display panel. For example, in peripheral regions where the display brightness may be low (and the display brightness emission profile may have relatively low values), the compensation profile may have higher values and the display values (e.g., R, G, and B values) for the pixels in the regions may be increased (e.g., by certain ratios corresponding to the values of the compensation profiles).

Figure 12:
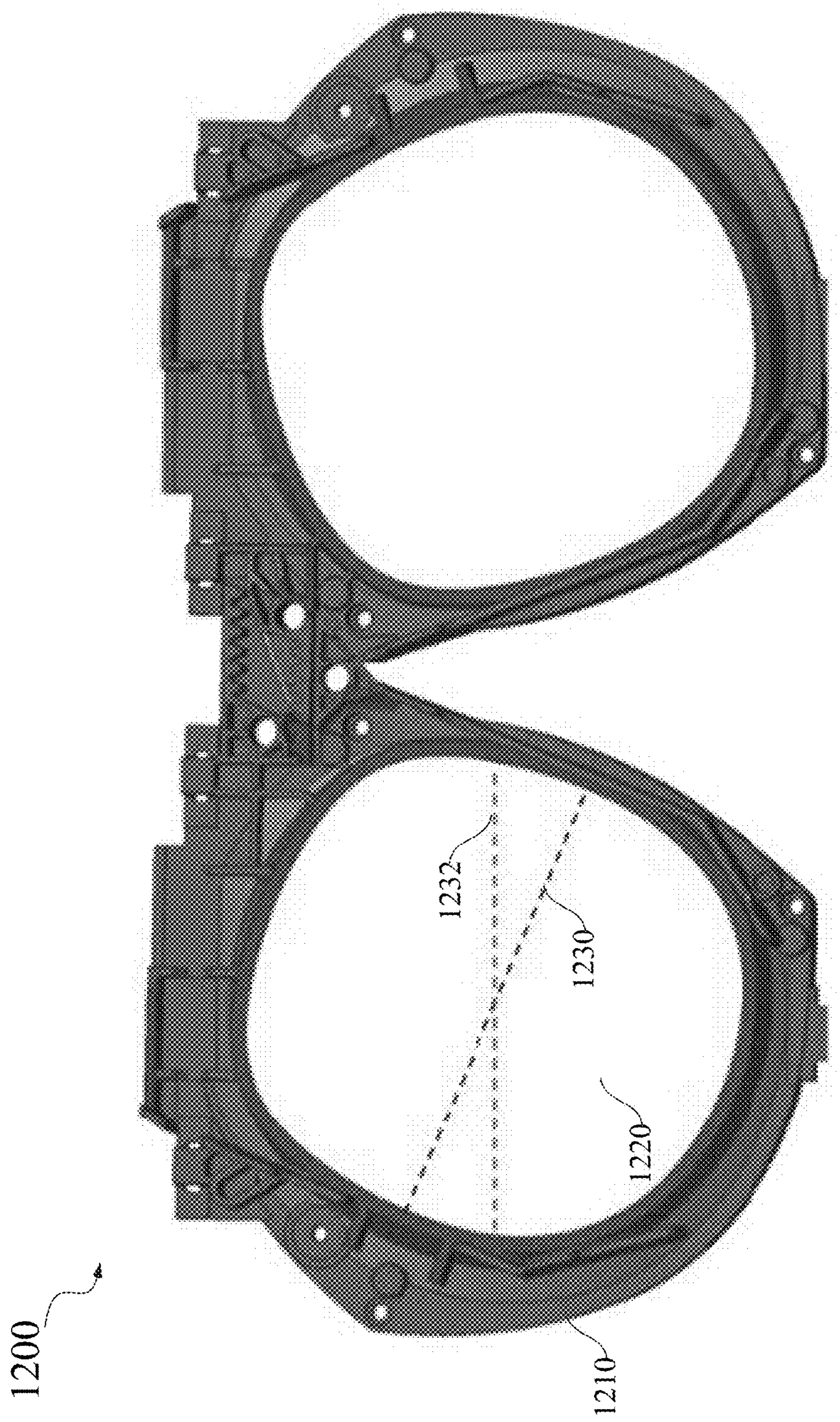
FIG. 12 illustrates an example of an HMD including a pair of display panels.

FIG. 12 illustrates an example of an HMD 1200 including a pair of display panels 1220 that may be placed in a frame 1210 in a tilted manner rather than in a parallel manner. In the illustrated example, the horizontal axis of each display panel 1220 is shown by a line 1230, whereas the horizontal axis of HMD 1200 is shown by a line 1232. As illustrated, the horizontal axis (shown by line 1230) of each display panel 1220 may not match the horizontal axis (shown by line 1232) of the HMD 1200. As such, if the BRO effect is more severe along the horizontal axis (shown by line 1232) of HMD 1200 rather than the horizontal axes (shown by line 1230) of individual display panels 1220, the BRO and brightness nonuniformity of HMD 1200 may be geometrically corrected in a manner different from the manner for correcting the BRO and brightness nonuniformity of a single display panel 1220. For example, the BRO and brightness nonuniformity may be compensated based on the orientation of individual display panels 1220, for example, according to a display brightness emission profile along the direction of the horizontal axis of HMD 1200 and the orientation of horizontal axis of display panel 1220 with respect to the horizontal axis of HMD 1200.

Figure 13:
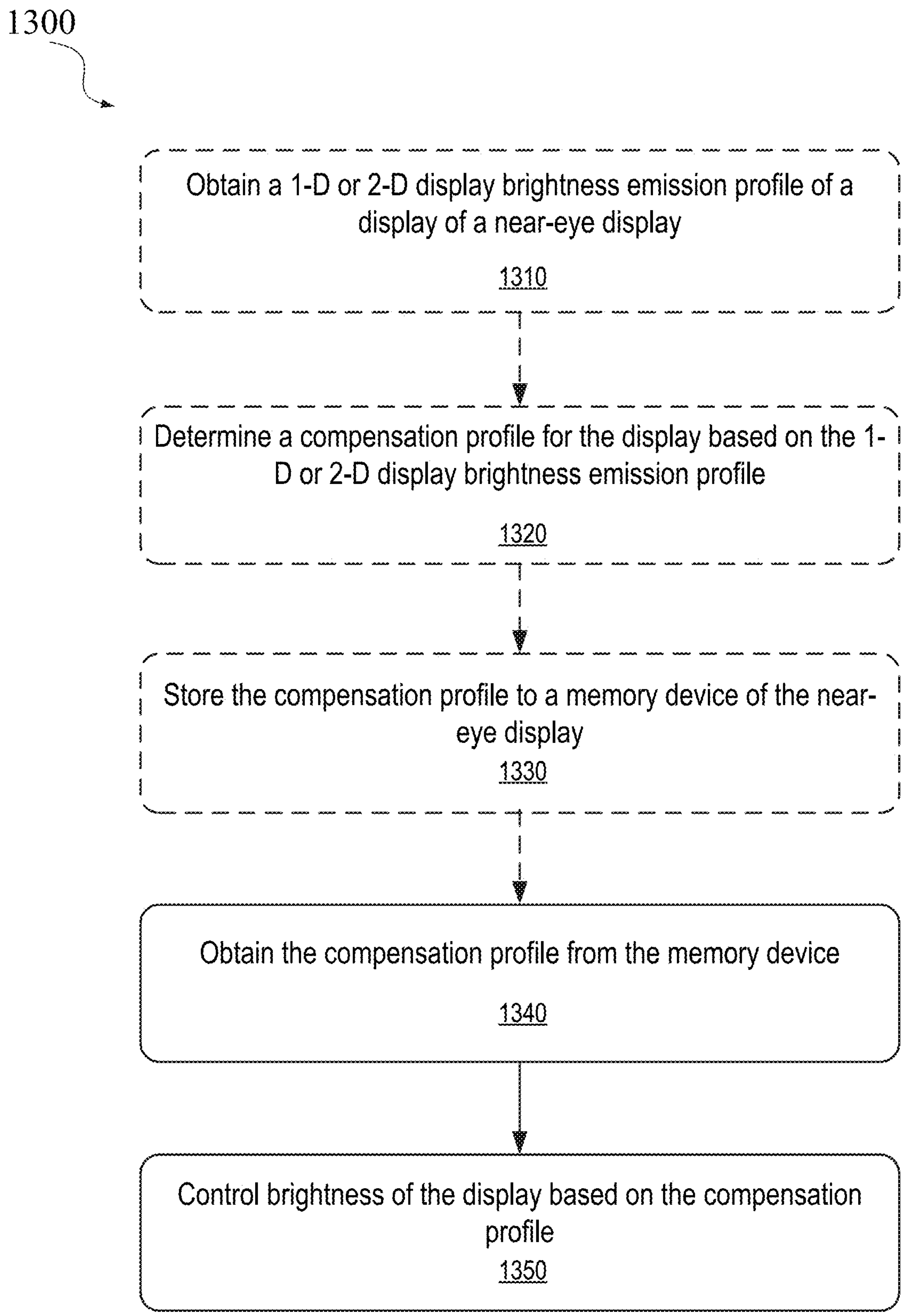
FIG. 13 includes flowchart illustrating an example of a method of compensating the brightness nonuniformity of a near-eye display according to certain embodiments.

FIG. 13 includes flowchart 1300 illustrating an example of a method of compensating the brightness nonuniformity of a near-eye display according to certain embodiments. In the illustrated example, the method may include, at an optional block 1310, obtaining a one-dimensional (1-D) or two-dimensional (2-D) display brightness emission profile of a display including a display panel and/or display optics (e.g., a lens such as a pancake lens or a Fresnel lens). The display may have brightness roll-off associated with the display panel and/or the display optics. The display brightness emission profile may be generated by, for example, configuring the display to display an image having uniform pixel data and measuring the brightness of regions of the display from different angles using a tester that is capable of measuring from different off-axis angles. Thus, the display brightness emission profile may indicate perceived brightness of the regions of the display. In some implementations, a 1-D display brightness emission profile rather than a 2-D display brightness emission profile may be measured or otherwise obtained. In some implementations, a 2-D display brightness emission profile rather than a 1-D display brightness emission profile may be measured or otherwise obtained. In some embodiments, different display brightness emission profiles may be generated for different gazing directions.

At optional block 1320, a compensation profile for the display may be determined based on the 1-D or 2-D display brightness emission profile. In some embodiments, the compensation profile may be complementary to the display brightness emission profile. For example, if a display appears to be dimmer on the left side than the right side, the compensation profile for the display may have a higher value on the left side than on the right side, such that light emitted by the display may be brighter on the left side to compensate the higher brightness roll-off on the left side. The display brightness emission profile may be a 1-D or 2-D display brightness emission profile, and thus the compensation profile may be a 1-D or 2-D display brightness emission profile. A 1-D compensation profile may indicate compensation values for regions of the display along one direction. A 2-D compensation profile may indicate compensation values for regions of a surface of the display. In some near-eye displays, the display may be tilted and thus the horizontal axis of the near-eye display and the horizontal axis of the display may be at a certain angle with respect to each other, the one-dimensional compensation profile may indicate compensation values for regions of the display along the horizontal axis of the near-eye display rather than along the horizontal axis of the display. In some embodiments, different compensation profiles may be generated for different gazing directions.

At optional block 1330, the compensation profile may be stored in a memory device of the near-eye display. The compensation profile may be used during normal operation of the near-eye display for compensating the brightness roll-off of the display. In some embodiments, multiple compensation profiles for different gazing directions may be stored in the memory device. Operations in blocks 1310-1330 may be performed in the factory, or may be performed once during initial setting of the near-eye display or periodically during the lifetime of the near-eye display.

At block 1340, a display controller of the near-eye display may read the compensation profile from the memory device. In some examples, the near-eye display may include an eye-tracking unit that may be used to determine a gazing direction of a user's eye. The display controller may, based on the gazing direction, obtain a compensation profile for compensating perceived brightness nonuniformity of the display in the gazing direction, from one or more compensation profiles stored in the memory device.

At block 1350, the display controller may control brightness of the display based on the compensation profile. The display controller may apply the compensation profile using a software approach or a hardware approach. For example, if the display is a locally dimmable LCD display or an OLED or micro-LED display, the compensation profile may be used by directly controlling the brightness of each dimmable LED zone of a backlight unit of an LCD display or each light source pixel on an OLED or micro-LED display. Alternatively, the compensation profile may be implemented using a software approach, where the compensation profile may be implemented as an image mask that may be placed in the graphics pipeline to modify the image data (e.g., pixel values such as RGB values) sent to the display panel. Thus, in some examples, the display controller may control the brightness of the display by modifying pixel data of an image to be displayed by the display based on the compensation profile. In some examples, the display controller may control the brightness of the display by controlling brightness of a plurality of light sources of a plurality of zones of the backlight unit of a liquid crystal display panel based on the compensation profile. In some examples, the display controller may control the brightness of the display by controlling brightness of light source pixels of an OLED or micro-LED display panel based on the compensation profile.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 14:
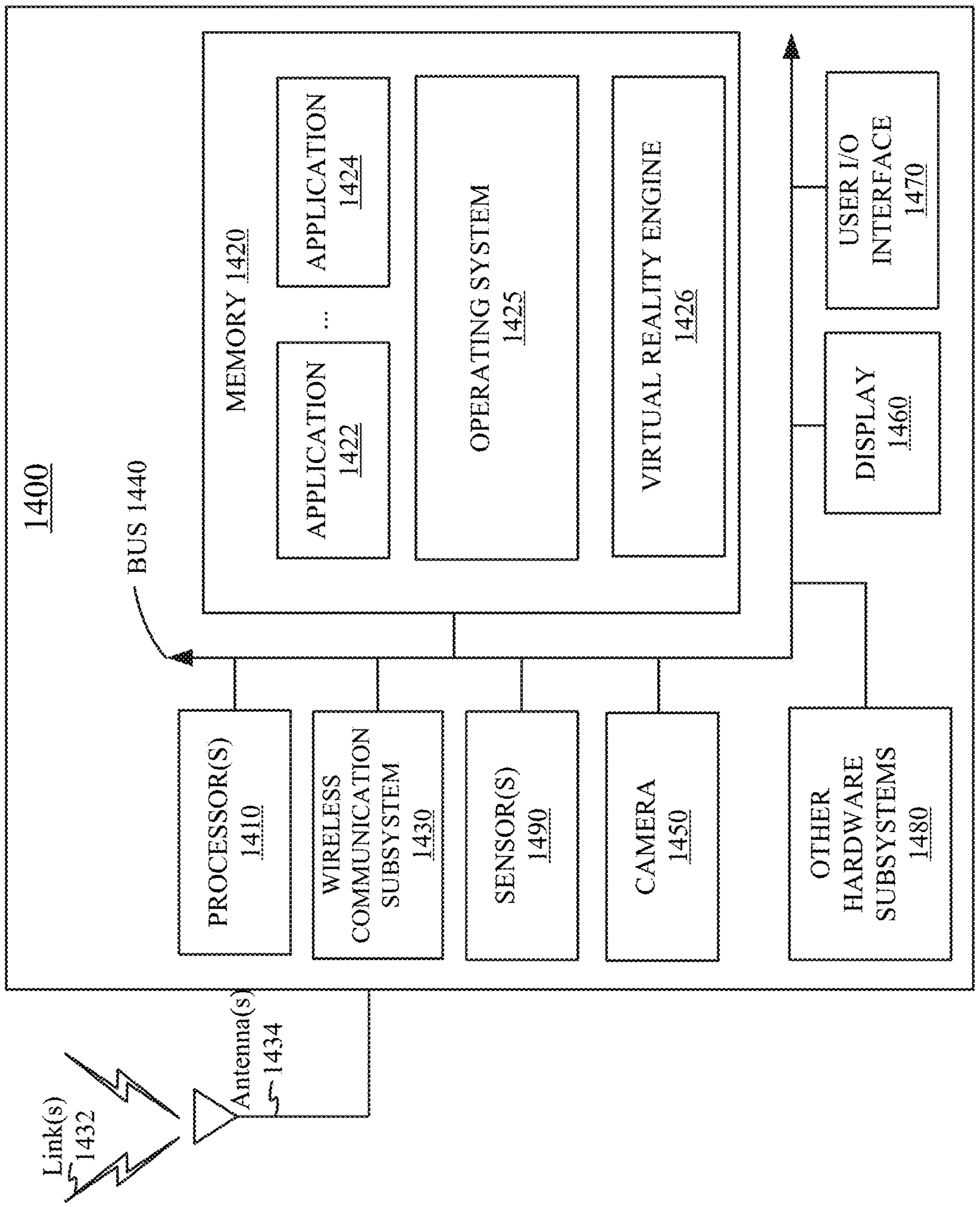
FIG. 14 is a simplified block diagram of an electronic system of an example of a near-eye display for implementing some of the examples disclosed herein.

FIG. 14 is a simplified block diagram of an example electronic system 1400 of an example near-eye display (e.g., HMD device) for implementing some of the examples disclosed herein. Electronic system 1400 may be used as the electronic system of an HMD device or other near-eye displays described above. In this example, electronic system 1400 may include one or more processor(s) 1410 and a memory 1420. Processor(s) 1410 may be configured to execute instructions for performing operations at a number of components, and can be, for example, a general-purpose processor or microprocessor suitable for implementation within a portable electronic device. Processor(s) 1410 may be communicatively coupled with a plurality of components within electronic system 1400. To realize this communicative coupling, processor(s) 1410 may communicate with the other illustrated components across a bus 1440. Bus 1440 may be any subsystem adapted to transfer data within electronic system 1400. Bus 1440 may include a plurality of computer buses and additional circuitry to transfer data.

Memory 1420 may be coupled to processor(s) 1410. In some embodiments, memory 1420 may offer both short-term and long-term storage and may be divided into several units. Memory 1420 may be volatile, such as static random access memory (SRAM) and/or dynamic random access memory (DRAM) and/or non-volatile, such as read-only memory (ROM), flash memory, and the like. Furthermore, memory 1420 may include removable storage devices, such as secure digital (SD) cards. Memory 1420 may provide storage of computer-readable instructions, data structures, program code, and other data for electronic system 1400. In some embodiments, memory 1420 may be distributed into different hardware subsystems. A set of instructions and/or code might be stored on memory 1420. The instructions might take the form of executable code that may be executable by electronic system 1400, and/or might take the form of source and/or installable code, which, upon compilation and/or installation on electronic system 1400 (e.g., using any of a variety of generally compilers, available installation programs, compression/decompression utilities, etc.), may take the form of executable code.

In some embodiments, memory 1420 may store a plurality of applications 1422 through 1424, which may include any number of applications. Examples of applications may include gaming applications, conferencing applications, video playback applications, or other suitable applications. The applications may include a depth sensing function or eye tracking function. Applications 1422-1424 may include particular instructions to be executed by processor(s) 1410. In some embodiments, certain applications or parts of applications 1422-1424 may be executable by other hardware subsystems 1480. In certain embodiments, memory 1420 may additionally include secure memory, which may include additional security controls to prevent copying or other unauthorized access to secure information.

In some embodiments, memory 1420 may include an operating system 1425 loaded therein. Operating system 1425 may be operable to initiate the execution of the instructions provided by applications 1422-1424 and/or manage other hardware subsystems 1480 as well as interfaces with a wireless communication subsystem 1430 which may include one or more wireless transceivers. Operating system 1425 may be adapted to perform other operations across the components of electronic system 1400 including threading, resource management, data storage control and other similar functionality.

Wireless communication subsystem 1430 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1400 may include one or more antennas 1434 for wireless communication as part of wireless communication subsystem 1430 or as a separate component coupled to any portion of the system. Depending on desired functionality, wireless communication subsystem 1430 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1430 may permit data to be exchanged with a network, other computer systems, and/or any other devices described herein. Wireless communication subsystem 1430 may include a means for transmitting or receiving data, such as identifiers of HMD devices, position data, a geographic map, a heat map, photos, or videos, using antenna(s) 1434 and wireless link(s) 1432.

Embodiments of electronic system 1400 may also include one or more sensors 1490. Sensor(s) 1490 may include, for example, an image sensor, an accelerometer, a pressure sensor, a temperature sensor, a proximity sensor, a magnetometer, a gyroscope, an inertial sensor (e.g., a subsystem that combines an accelerometer and a gyroscope), an ambient light sensor, or any other similar devices or subsystems operable to provide sensory output and/or receive sensory input, such as a depth sensor or a position sensor. For example, in some implementations, sensor(s) 1490 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1400 may include a display 1460. Display 1460 may be a near-eye display, and may graphically present information, such as images, videos, and various instructions, from electronic system 1400 to a user. Such information may be derived from one or more applications 1422-1424, virtual reality engine 1426, one or more other hardware subsystems 1480, a combination thereof, or any other suitable means for resolving graphical content for the user (e.g., by operating system 1425). Display 1460 may use liquid crystal display (LCD) technology, light-emitting diode (LED) technology (including, for example, OLED, ILED, μLED, AMOLED, TOLED, etc.), light emitting polymer display (LPD) technology, or some other display technology.

Electronic system 1400 may include a user input/output interface 1470. User input/output interface 1470 may allow a user to send action requests to electronic system 1400. An action request may be a request to perform a particular action. For example, an action request may be to start or end an application or to perform a particular action within the application. User input/output interface 1470 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1400. In some embodiments, user input/output interface 1470 may provide haptic feedback to the user in accordance with instructions received from electronic system 1400. For example, the haptic feedback may be provided when an action request is received or has been performed.

Electronic system 1400 may include a camera 1450 that may be used to take photos or videos of a user, for example, for tracking the user's eye position. Camera 1450 may also be used to take photos or videos of the environment, for example, for VR, AR, or MR applications. Camera 1450 may include, for example, a complementary metal-oxide-semiconductor (CMOS) image sensor with a few millions or tens of millions of pixels. In some implementations, camera 1450 may include two or more cameras that may be used to capture 3-D images.

In some embodiments, electronic system 1400 may include a plurality of other hardware subsystems 1480. Each of other hardware subsystems 1480 may be a physical subsystem within electronic system 1400. While each of other hardware subsystems 1480 may be permanently configured as a structure, some of other hardware subsystems 1480 may be temporarily configured to perform specific functions or temporarily activated. Examples of other hardware subsystems 1480 may include, for example, an audio output and/or input interface (e.g., a microphone or speaker), a near field communication (NFC) device, a rechargeable battery, a battery management system, a wired/wireless battery charging system, etc. In some embodiments, one or more functions of other hardware subsystems 1480 may be implemented in software.

In some embodiments, memory 1420 of electronic system 1400 may also store a virtual reality engine 1426. Virtual reality engine 1426 may execute applications within electronic system 1400 and receive position information, acceleration information, velocity information, predicted future positions, or some combination thereof of the HMD device from the various sensors. In some embodiments, the information received by virtual reality engine 1426 may be used for producing a signal (e.g., display instructions) to display 1460. For example, if the received information indicates that the user has looked to the left, virtual reality engine 1426 may generate content for the HMD device that mirrors the user's movement in a virtual environment. Additionally, virtual reality engine 1426 may perform an action within an application in response to an action request received from user input/output interface 1470 and provide feedback to the user. The provided feedback may be visual, audible, or haptic feedback. In some implementations, processor(s) 1410 may include one or more GPUs that may execute virtual reality engine 1426.

In various implementations, the above-described hardware and subsystems may be implemented on a single device or on multiple devices that can communicate with one another using wired or wireless connections. For example, in some implementations, some components or subsystems, such as GPUs, virtual reality engine 1426, and applications (e.g., tracking application), may be implemented on a console separate from the head-mounted display device. In some implementations, one console may be connected to or support more than one HMD.

In alternative configurations, different and/or additional components may be included in electronic system 1400. Similarly, functionality of one or more of the components can be distributed among the components in a manner different from the manner described above. For example, in some embodiments, electronic system 1400 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or a combination of A, B, and/or C, such as AB, AC, BC, AA, ABC, AAB, ACC, AABBCCC, or the like.

In this description, the recitation "based on" means "based at least in part on." Therefore, if X is based on Y, then X may be a function of at least a part of Y and any number of other factors. If an action X is "based on" Y, then the action X may be based at least in part on at least a part of Y.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A processor-implemented method comprising:

obtaining a compensation profile for compensating perceived brightness nonuniformity of a display of a near-eye display;

correcting the compensation profile based on a mismatch between an axis of the display and an additional axis of the near-eye display, the correction is based on a brightness emission profile; and controlling brightness of the display based on the compensation profile.

2. The processor-implemented method of claim 1, further comprising:

obtaining a display brightness emission profile of the display measured when the display is configured to display an image having uniform pixel data, the display brightness emission profile indicating perceived brightness of the regions of the display;

determining the compensation profile based on the display brightness emission profile; and storing the compensation profile in a memory device of the near-eye display.

3. The processor-implemented method of claim 2, wherein the compensation profile is complementary to the display brightness emission profile of the display.

4. The processor-implemented method of claim 1, wherein the compensation profile includes a one-dimensional compensation profile indicating compensation values for regions of the display along one direction, or a two-dimensional compensation profile indicating compensation values for regions of a surface of the display.

5. The processor-implemented method of claim 1, wherein:

the display includes a display panel and display optics; and the compensation values of the compensation profile include compensation values for compensating perceived brightness nonuniformity associated with both the display panel and the display optics.

6. The processor-implemented method of claim 1, wherein controlling the brightness of the display based on the compensation profile includes modifying pixel data of an image to be displayed by the display based on the compensation profile.

7. The processor-implemented method of claim 1, wherein:

the display includes a liquid crystal display panel having a backlight unit that includes a plurality of light sources for a plurality of regions of the liquid crystal display panel; and controlling the brightness of the display based on the compensation profile includes controlling brightness of the plurality of light sources of the backlight unit of the liquid crystal display panel based on the compensation profile.

8. The processor-implemented method of claim 1, wherein:

the display includes an organic light-emitting diode (OLED) or micro light emitting diode (micro-LED) display panel; and controlling the brightness of the display based on the compensation profile includes controlling brightness of light source pixels of the OLED or micro-LED display panel based on the compensation profile.

9. The processor-implemented method of claim 1, further comprising:

determining a gazing direction of a user's eye;

obtaining, based on the gazing direction, an alternative compensation profile for compensating perceived brightness nonuniformity of the display in the gazing direction; and controlling brightness of the display according to the alternative compensation profile.

10. A near-eye display comprising:

a display configured to display images;

a memory device storing a compensation profile for compensating perceived brightness nonuniformity of the display; and a display controller for controlling operations of the display, the display controller configured to:

correct the compensation profile based on a mismatch between an axis of the display and an additional axis of the near-eye display, the correction is based on a brightness emission profile; and control brightness of the display based on the compensation profile.

11. The near-eye display of claim 10, wherein the compensation profile is determined based on a display brightness emission profile of the display measured when the display is configured to display an image having uniform pixel data, the display brightness emission profile indicating perceived brightness of the regions of the display.

12. The near-eye display of claim 11, wherein the compensation profile is complementary to the display brightness emission profile.

13. The near-eye display of claim 10, wherein the compensation profile includes a one-dimensional compensation profile indicating compensation values for regions of the display along one direction, or a two-dimensional compensation profile indicating compensation values for regions of a surface of the display.

14. The near-eye display of claim 13, wherein the one-dimensional compensation profile indicates compensation values for regions of the display along a horizontal axis of the near-eye display that is different from a horizontal axis of the display.

15. The near-eye display of claim 10, wherein:

the display includes a display panel and display optics; and the compensation values of the compensation profile include compensation values for compensating perceived brightness nonuniformity associated with both the display panel and the display optics.

16. The near-eye display of claim 15, wherein the display optics include a pancake lens.

17. The near-eye display of claim 10, wherein the display controller is configured to control the brightness of the display by modifying pixel data of an image to be displayed by the display based on the compensation profile.

18. The near-eye display of claim 10, wherein:

the display includes a liquid crystal display panel having a backlight unit that includes a plurality of light sources for a plurality of regions of the liquid crystal display panel; and the display controller is configured to control the brightness of the display by controlling brightness of the plurality of light sources of the backlight unit of the liquid crystal display panel based on the compensation profile.

19. The near-eye display of claim 10, wherein:

the display includes an organic light-emitting diode (OLED) or micro-light emitting diode (micro-LED) display panel; and the display controller is configured to control the brightness of the display by controlling brightness of light source pixels of the OLED or micro-LED display panel based on the compensation profile.

20. The near-eye display of claim 10, further comprising an eye-tracking unit, wherein:

the eye-tracking unit is configured to determine a gazing direction of a user's eye;

the memory device stores one or more alternative compensation profiles for compensating perceived brightness nonuniformity of the display in different gazing directions; and the display controller is configured to:

obtain, from the one or more alternative compensation profiles and based on the gazing direction, an alternative compensation profile for compensating perceived brightness nonuniformity of the display in the gazing direction; and control the brightness of the display based on the alternative compensation profile.

* * * * *